US012623455B2

(12) United States Patent
Kim et al.

(10) Patent No.: US 12,623,455 B2
(45) Date of Patent: May 12, 2026

(54) PRINTING DEVICE FOR HIGH VISCOUS FLUIDS WITH SELECTIVE NOZZLE ACTIVATION

(71) Applicant: Samsung Display Co., LTD., Yongin-si (KR)

(72) Inventors: Yong Hwan Kim, Yongin-si (KR); Min Ho Bae, Yongin-si (KR); Hae Wook Yang, Yongin-si (KR); Gil Jun Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 144 days.

(21) Appl. No.: 18/432,424

(22) Filed: Feb. 5, 2024

(65) Prior Publication Data

US 2025/0018710 A1 Jan. 16, 2025

(30) Foreign Application Priority Data

Jul. 11, 2023 (KR) ........................ 10-2023-0089971

(51) Int. Cl.
*B41J 2/06* (2006.01)

(52) U.S. Cl.
CPC ....................................... *B41J 2/06* (2013.01)

(58) Field of Classification Search
CPC ...................................... B41J 2/06; B41J 2/14
See application file for complete search history.

(56) References Cited

U.S. PATENT DOCUMENTS

| | | | |
|---|---|---|---|
| 10,828,896 B1 | 11/2020 | Byun et al. | |
| 2018/0009223 A1* | 1/2018 | Poulikakos | B41J 2/1433 |

FOREIGN PATENT DOCUMENTS

| | | |
|---|---|---|
| KR | 100596200 B1 | 7/2006 |
| KR | 100975668 B1 | 8/2010 |
| KR | 101264215 B1 | 5/2013 |
| KR | 101982826 B1 | 5/2019 |
| KR | 102229578 B1 | 3/2021 |
| KR | 20220092522 A | 7/2022 |
| WO | 2006088282 A1 | 8/2006 |
| WO | 2021093929 A1 | 5/2021 |

* cited by examiner

*Primary Examiner* — Bradley W Thies
(74) *Attorney, Agent, or Firm* — CANTOR COLBURN LLP

(57) ABSTRACT

A printing device includes a reservoir accommodating a fluid, a first nozzle disposed on the bottom of the reservoir, the first nozzle including a plurality of nozzle holes through which the fluid is discharged as a droplet, first electrodes disposed on at least a portion of the bottom of the first nozzle, corresponding to the plurality of nozzle holes and a first insulating layer surrounding the first electrodes.

20 Claims, 10 Drawing Sheets

PRINTING DEVICE FOR HIGH VISCOUS FLUIDS WITH SELECTIVE NOZZLE ACTIVATION

This application claims priority to Korean Patent Application No. 10-2023-0089971, filed on Jul. 11, 2023, and all the benefits accruing therefrom under 35 U.S.C. § 119, the content of which in its entirety is herein incorporated by reference.

BACKGROUND

1. Field

The invention generally relates to a printing device, and more particularly to a printing device using a high viscous fluid.

2. Description of the Related Art

A printing device is a device which prints patterns or forms on a target by discharging a fluid through a nozzle. For example, a printing device to which an electrohydrodynamic printing method is applied may form an electric field between a nozzle and a target and apply an electrostatic force to a fluid, thereby discharging the fluid in the form of a droplet.

SUMMARY

Embodiments provide a printing device in which discharge of a high viscous fluid is possible, and electric field interference between nozzles (or nozzle holes) is reduced, so that area printing can be readily performed.

In accordance with an embodiment, a printing device includes a reservoir accommodating a fluid, a first nozzle disposed on the bottom of the reservoir, the first nozzle including a plurality of nozzle holes through which the fluid is discharged as a droplet, first electrodes disposed on at least a portion of the bottom of the first nozzle, corresponding to the plurality of nozzle holes and a first insulating layer surrounding the first electrodes.

In an embodiment, when a distance between the plurality of nozzle holes is smaller than a size of the droplet, the distance between the plurality of nozzle holes may be about 50% to about 90% of the size of the droplet.

In an embodiment, a size of a particle included in the fluid may be about 100 μm or less.

In an embodiment, an internal diameter of each of the nozzle holes may be about 100 μm to about 500 μm.

In an embodiment, the first electrodes may overlap with at least a portion of an end of the first nozzle.

In an embodiment, the first insulating layer may be in contact with at least a portion of an end of the first nozzle.

In an embodiment, the printing device may further include connection electrodes electrically connected to the first electrodes.

In an embodiment, the printing device may further include a control unit individually controlling whether the droplet is to be discharged through each of the nozzle holes, wherein the control unit may selectively apply a discharge voltage to each of the first electrodes.

In an embodiment, an electric field may be formed between the first electrodes and a grounded target such that the fluid is modified as the droplet to be discharged.

In an embodiment, when a distance between the plurality of nozzle holes is greater than a size of the droplet, the printing device may be rotated to be at a selectable angle.

In an embodiment, the selectable angle may be about 45° or less.

In an embodiment, the plurality of nozzle holes may be arranged in one row.

In an embodiment, the plurality of nozzle holes may be arranged in two rows, and nozzle holes arranged in each row may be arranged side by side.

In an embodiment, the plurality of nozzle holes may be arranged in two rows, and may be arranged in a zigzag pattern.

In an embodiment, the printing device may further include a second nozzle disposed on the bottom of the first insulating layer, second electrodes disposed on at least a portion of the bottom of the second nozzle, corresponding to the plurality of nozzle holes and a second insulating layer surrounding the second electrodes.

In an embodiment, the second electrodes may overlap with at least a portion of an end of the second nozzle.

In an embodiment, the second insulating layer may be in contact with at least a portion of an end of the second nozzle.

In an embodiment, an electric field may be formed by a potential difference between the first electrodes and the second electrodes such that the fluid is modified as the droplet to be discharged.

In an embodiment, a negative voltage or no voltage may be applied to the first electrodes, and a positive voltage may be applied to the second electrodes.

In an embodiment, the printing device may form a pattern on a target through area printing.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
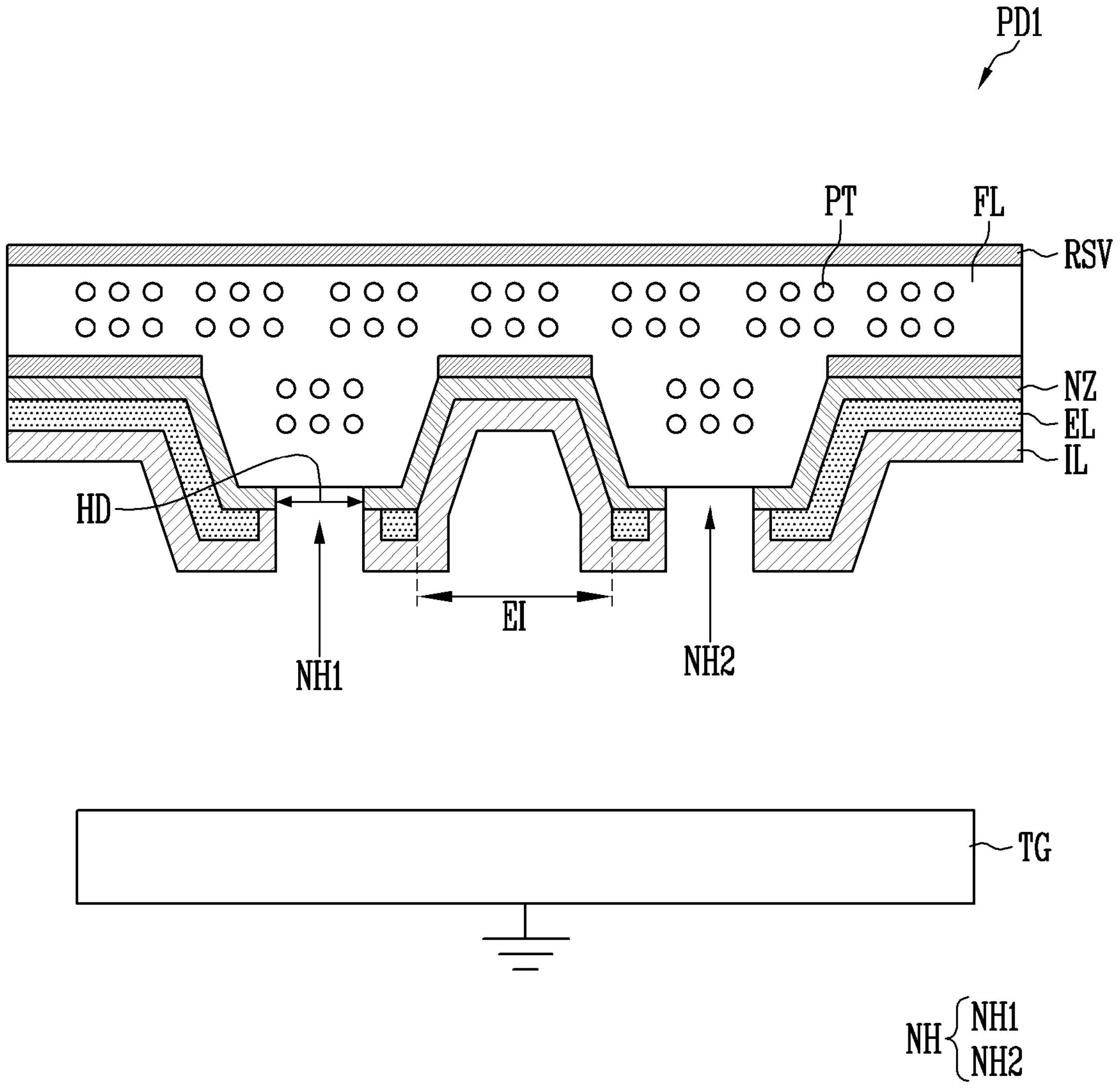
FIG. 1 is a cross-sectional view of a printing device, in accordance with an embodiment.

The invention will be described more fully hereinafter with reference to the accompanying drawings, in which various embodiments are shown. The invention may, however, be embodied in many different forms, and should not be construed as limited to the embodiments set forth herein. Rather, these embodiments are provided so that this disclosure will be thorough and complete, and will fully convey the scope of the invention to those skilled in the art.

Like numbers refer to like elements throughout. In the drawings, the thickness of certain lines, layers, components, elements or features may be exaggerated for clarity. It will be understood that, although the terms “first”, “second”, etc. may be used herein to describe various elements, these elements should not be limited by these terms. These terms are only used to distinguish one element from another element. Thus, a “first” element discussed below could also be termed a “second” element without departing from the teachings of the invention.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items.

It will be further understood that the terms “comprises” and/or “comprising,” or “includes” and/or “including”, when used in this specification, specify the presence of stated features, integers, steps, operations, elements, and/or components, but do not preclude the presence and/or addition of one or more other features, integers, steps, operations, elements, components, and/or groups thereof.

In the entire specification, when an element is referred to as being “connected” or “coupled” to another element, it can be directly connected or coupled to another element or be indirectly connected or coupled to another element with one or more intervening elements interposed therebetween.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Hereinafter, embodiments of the invention will be described in detail with reference to the accompanying drawings.

Figure 2:
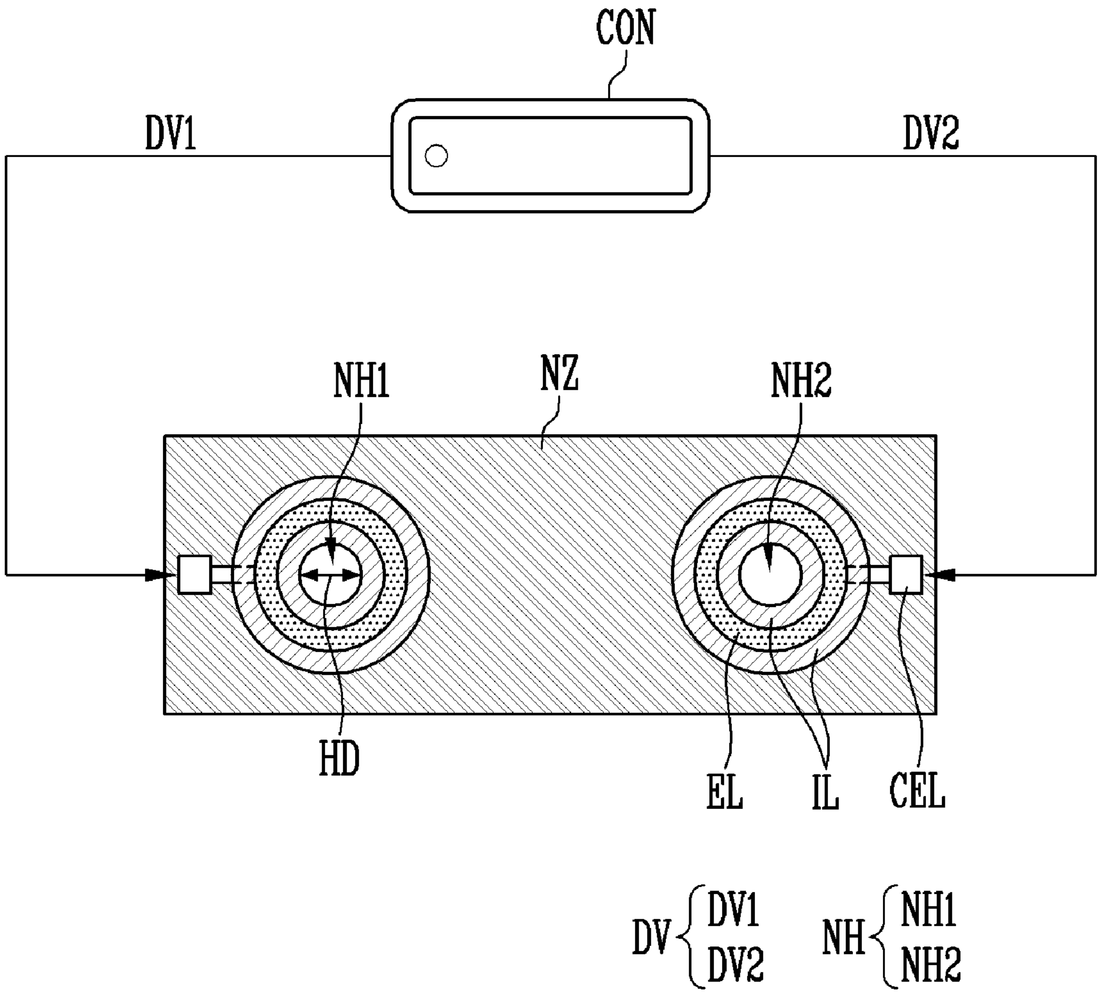
FIG. 2 is a schematic block diagram illustrating an operation method of a control unit of the printing device, in accordance with an embodiment.

FIG. 1 is a view illustrating a printing device PD1, in accordance with an embodiment. FIG. 2 is a view illustrating an operation method of a control unit CON of the printing device PD1, in accordance with an embodiment.

Referring to FIGS. 1 and 2, the printing device PD1, in accordance with the embodiment, may be a device which prints patterns or forms on a target TG. In an embodiment, the printing device PD1 may discharge a fluid FL, using an electrohydrodynamic printing method. The electrohydrodynamic printing method is a method of forming an electric field and applying an electrostatic force to the fluid FL, thereby discharging the fluid FL in the form of a droplet DL (see FIG. 3).

In an embodiment and referring to FIG. 1, the printing device PD1 may include a reservoir RSV, a nozzle NZ, electrodes EL, and an insulating layer IL.

In an embodiment, the reservoir RSV may accommodate the fluid FL. The reservoir RSV may be connected to a fluid supply (not shown) to receive the fluid FL provided from the fluid supply.

In an embodiment, the nozzle NZ may be disposed on the bottom of the reservoir RSV. The nozzle NZ is a component for discharging the fluid FL stored in the reservoir RSV. To this end, the nozzle NZ may include a plurality of nozzle holes NH through which the fluid FL is discharged. In FIG. 1, two nozzle holes NH1 and NH2 disposed adjacent to each other are illustrated as an example of the nozzle holes NH. However, the number of nozzle holes NH is not limited thereto.

In an embodiment and referring to FIGS. 1 and 2, an internal diameter HD of the nozzle hole NH may be greater than a size of a particle PT included in the fluid FL. Accordingly, the fluid FL can be stably discharged through the nozzle hole NH. A specific numerical value of the internal diameter HD of the nozzle hole NH may be determined according to the size of the particle PT included in the fluid FL. When the fluid FL is a high viscous fluid having high viscosity, the size of the particle PT included in the fluid FL may be about 20 μm to about 100 μm. When the viscosity of the fluid FL is hundreds to tens of thousands of centipoise, this may mean that the viscosity of the fluid FL is high. Also, when the fluid FL is a low viscous fluid having low viscosity, the size of the particle PT included in the fluid FL may be less than about 20 μm. When the viscosity of the fluid FL is tens of centipoise, this means that the viscosity of the fluid FL is low.

In an embodiment, the internal diameter HD of the nozzle hole NH may be about 100 μm to about 500 μm. For example, the internal diameter HD of the nozzle hole NH may be greater than the size of the particle PT included in the fluid FL regardless of the viscosity of the fluid FL. Thus, not only when the viscosity of the fluid FL is low but also when the viscosity of the fluid FL is high, the fluid FL can be stably discharged through the nozzle hole NH. Accordingly, since a high viscous fluid can be readily discharged in the printing device PD1, a thick pattern or shape can be printed a small number of printing times. A protective film, a cover glass, and the like of a display panel, which are formed of a high viscous material, can be directly printed without any lamination process. Thus, manufacturing processes of a display device can be simplified, and the cost of the display device can be saved.

In an embodiment, the electrodes EL are components for forming an electric field in each of the nozzle holes NH. The electrodes EL may be disposed to be correspond to each of the nozzle holes NH. Therefore, when a discharge voltage DV is applied to the electrodes EL, an electric field due to a potential difference between each electrode EL and the grounded target TG may be formed in the nozzle holes NH. For example, when a first discharge voltage DV1 is applied to an electrode EL disposed corresponding to a first nozzle hole NH1, the electric field may be formed in the first nozzle hole NH1. When a second discharge voltage DV2 is applied to an electrode EL disposed corresponding to a second nozzle hole NH2, the electric field may be formed in the second nozzle hole NH2.

In an embodiment, the electrodes EL may be disposed on at least a portion of the bottom of the nozzle NZ. For example, the electrodes EL may be disposed to be in contact with at least a portion of the bottom of the nozzle NZ. A distance EI between the electrodes EL is an important factor which has influence on electric field interference between the nozzle holes NH. For example, as the distance EI between the electrodes EL decreases, the electric field interference between the first nozzle hole NH1 and the second nozzle hole NH2 may increase. By way of example, when the fluid FL is a high viscous fluid having high viscosity, the magnitude of the discharge voltage DV applied to the electrodes EL increases, and therefore, the electric field interference may be further intensified.

In an embodiment, the electrodes EL may be disposed on the bottom of the nozzle NZ and overlap with at least a portion of an end of the nozzle NZ. When the electrodes EL are disposed in the vicinity of the end of the nozzle NZ, the distance EI between the electrodes EL increases, and therefore, the electric field interference between the nozzle holes NH may decrease. For example, when the electrodes EL are disposed in the vicinity of the end of the nozzle NZ, the electric field interference due to a short distance EI between the electrodes EL or application of a high discharge voltage DV may decrease.

In an embodiment, the insulating layer IL may be disposed to surround the electrodes EL. For example, the insulating layer IL may be disposed, while being in contact with the bottoms of the electrodes EL and at least a portion of the end of the nozzle NZ, to surround the electrodes EL. Accordingly, the insulating layer IL can prevent the electrodes EL from being in direct contact with external elements (moisture, air, and the like) or the discharged fluid FL. The insulating layer IL may include silicon oxide, silicon nitride, and the like, and have a single-layer structure or a multi-layer structure.

The printing device PD1, in accordance with an embodiment, may further include connection electrodes CEL. In an embodiment, an end portion of each of the electrodes EL may be connected to a corresponding connection electrode CEL. For example, the connection electrodes CEL may be disposed corresponding to end portions of the respective electrodes EL. The electrodes EL may be applied with the discharge voltage DV through the connection electrodes CEL.

In an embodiment, the printing device PD1 may further include a control unit CON. The control unit CON may individually control the nozzle holes NH through which the fluid FL is discharged. For example, the control unit CON may apply the first discharge voltage DV1 to a connection electrode CEL connected to the electrode EL disposed corresponding to the first nozzle hole NH1 such that the fluid FL is discharged through the first nozzle hole NH1. Also, the control unit CON may apply the second discharge voltage DV2 to a connection electrode CEL connected to the electrode EL disposed corresponding to the second nozzle hole NH2 such that the fluid FL is discharged through the second nozzle hole NH2. For example, the control unit CON may selectively control the discharge voltage applied to the connection electrodes CEL.

In an embodiment, the controller CON may control the discharge voltage DV, based on the viscosity of the fluid FL. For example, when the viscosity of the fluid FL is high, the magnitude of the discharge voltage DV may be hundreds to thousands of volts. On the contrary, when the viscosity of the fluid FL is low, the magnitude of the discharge voltage DV may be tens of volts.

Figure 3:
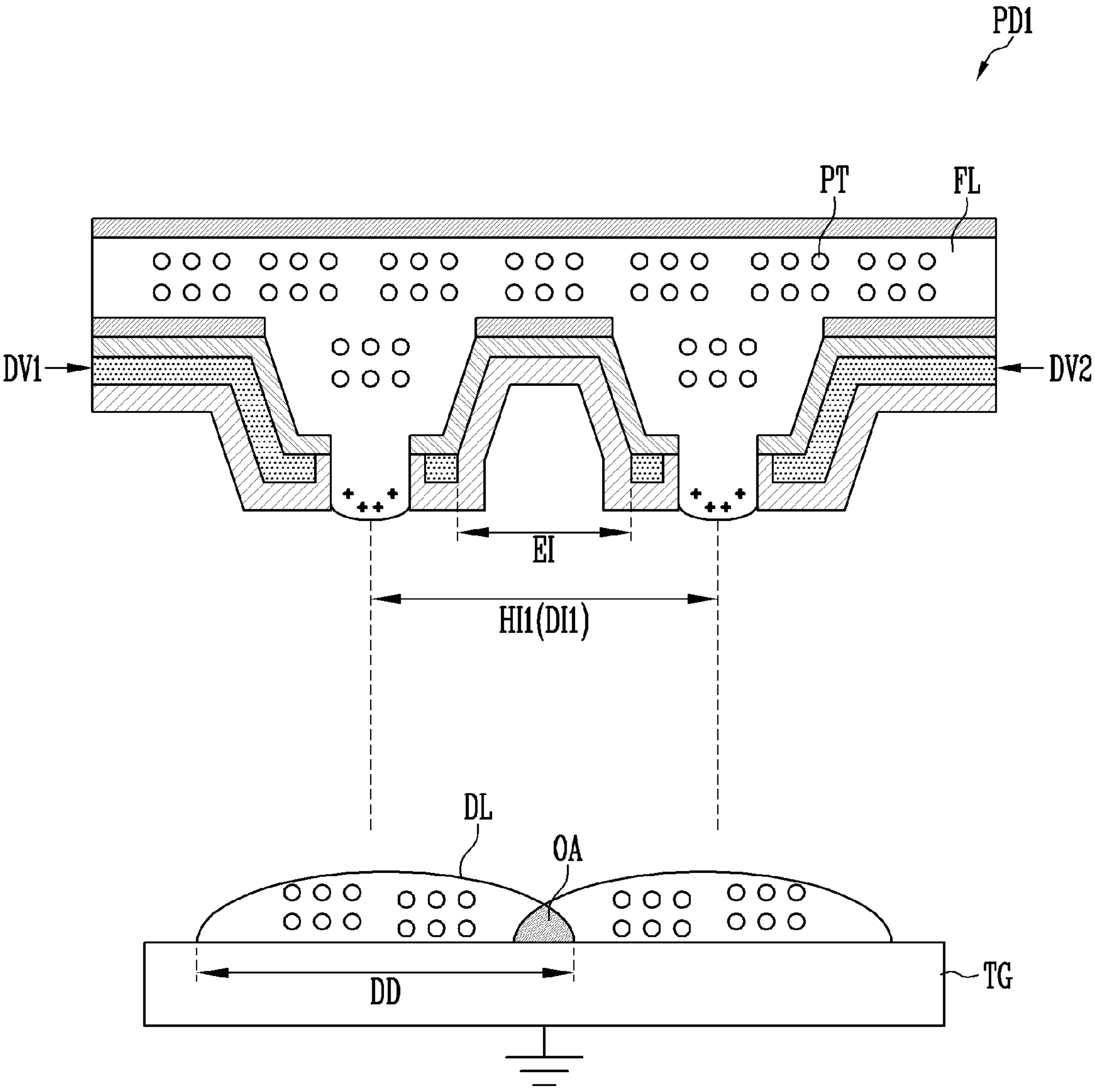
FIG. 3 is a cross-sectional view of the printing device illustrating area printing, in accordance with an embodiment.
Figure 4:
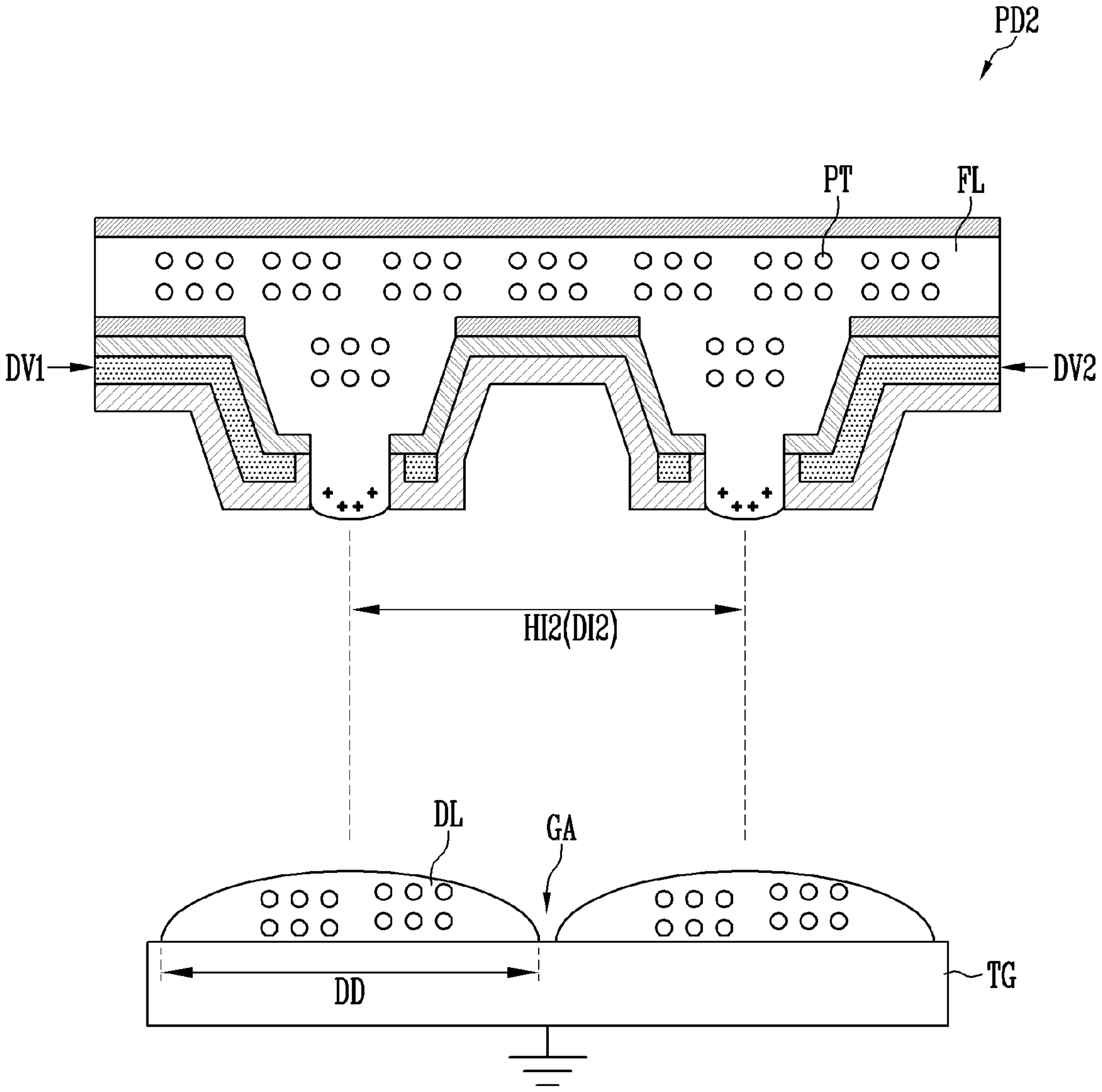
FIG. 4 is a cross-sectional view of a printing device illustrating line printing, in accordance with an embodiment.
Figure 5:
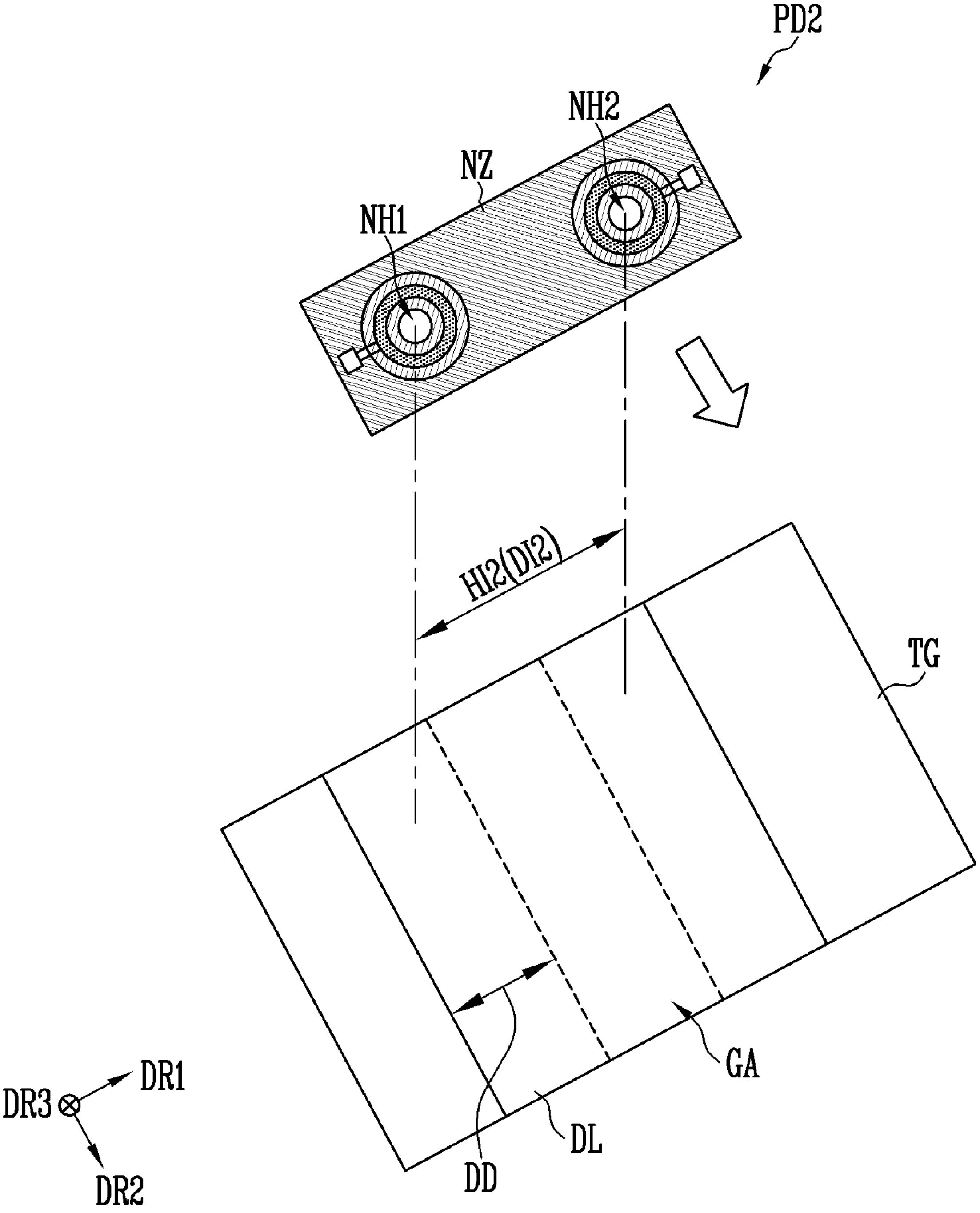
FIG. 5 is a block diagram of a printing device illustrating line printing, in accordance with an embodiment.
Figure 6:
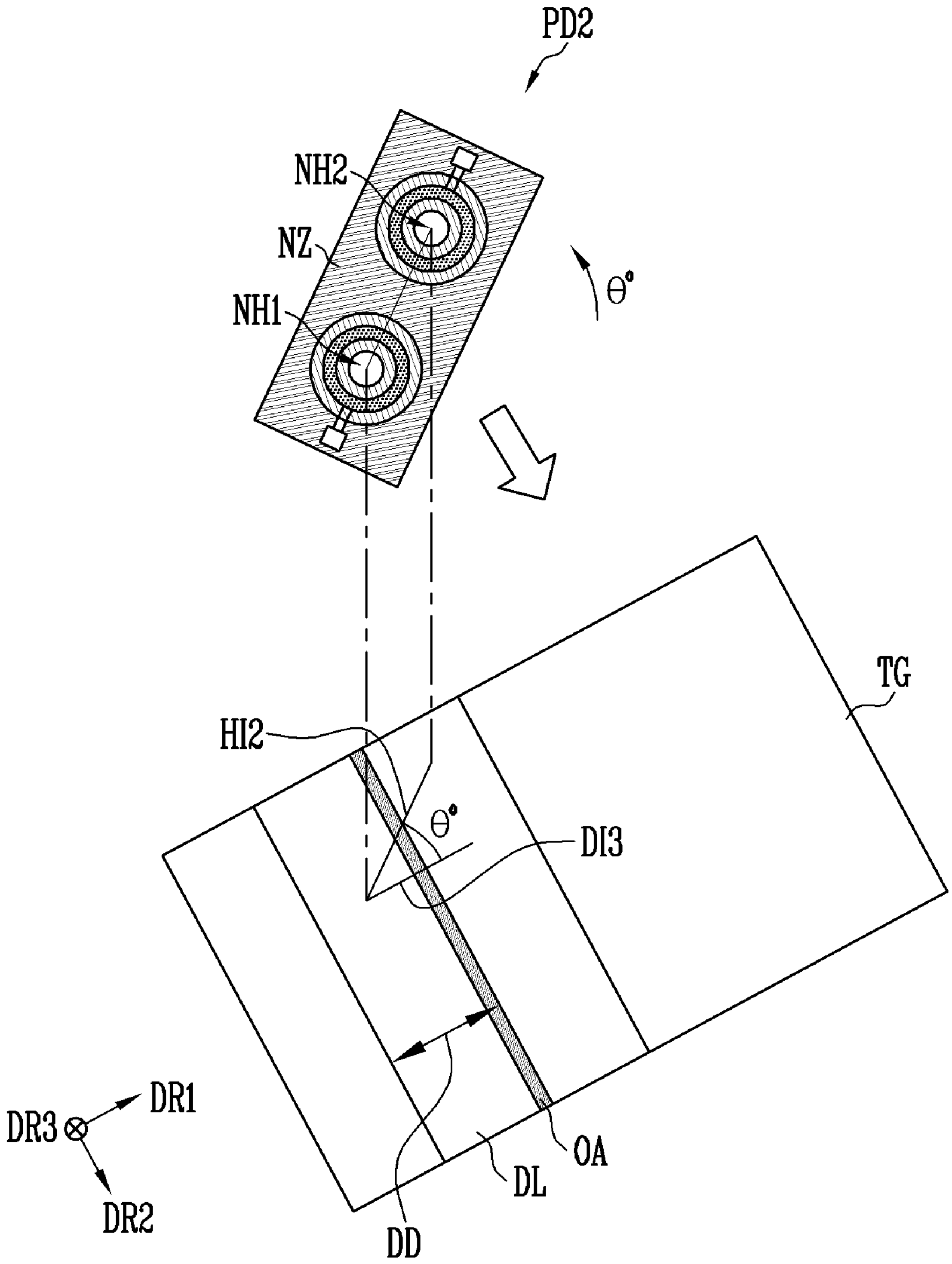
FIG. 6 is a block diagram of the printing device illustrating area printing, in accordance with an embodiment.

FIG. 3 is a cross-sectional view illustrating area printing by the printing device PD1 in accordance with an embodiment of the invention. FIGS. 4 and 5 are views illustrating line printing of a printing device PD2 in accordance with an embodiment. FIG. 6 is a view illustrating area printing of the printing device PD2 in accordance with an embodiment.

Referring to FIG. 3, the printing device PD1 in accordance with the embodiment may print patterns or forms on the target TG through area printing. When the first discharge voltage DV1 and the second discharge voltage DV2 are respectively applied to the electrodes EL (see FIG. 1), an electric field is formed in the first nozzle hole NH1 (see FIG. 1) and the second nozzle hole NH2 (see FIG. 2), and therefore, an electrostatic force may be applied to the fluid FL. Accordingly, the shape of the fluid FL is modified, so that the fluid FL can be discharged as a droplet DL through each of the first nozzle hole NH1 and the second nozzle hole NH2 and onto the target TG.

In an embodiment, a distance HI1 between the nozzle holes NH (see FIG. 1) may be smaller than a size DD of the discharged droplet DL. For example, the distance HI1 between the nozzle holes NH may be about 50% to about 90% of the size DD of the droplet DL. The distance HI1 between the nozzle holes NH may be equal to a distance DI1 between droplets DL. For example, since the distance DI1 between the droplets DL is smaller than the size DD of the droplet DL, an overlap area OA is formed between the droplets DL reaching the target TG, so that the area printing can be readily performed.

Meanwhile, in an embodiment, the size DD of the discharged droplet DL may vary according to a characteristic of the fluid FL, a surface state of the target TG, an intensity of the electric field, and the like.

In an embodiment and referring to FIGS. 4 and 5, in the printing device PD2 a distance HI2 between the nozzle holes NH1 and NH2 may be greater than the size DD of the discharged droplet DL. Since a distance DI2 between droplets DL is greater than the size DD of the droplet DL, a gap area GA is formed between the droplets DL reaching the target TG, and therefore, the area printing may not be readily performed. Referring to FIG. 5, the printing device PD2 may discharge the droplet DL to the target TG while moving in one direction in a state in which the printing device PD2 is parallel to the target TG. For example, each of the printing device PD2 and the target TG is located in an area defined by a first direction DR1 and a second direction DR2 and may be spaced apart from each other at a selectable distance to be parallel to each other. The printing device PD2 may discharge the droplet DL toward the target TG in a third direction DR3 while moving in the second direction DR2. For example, when the distance HI2 between the nozzle holes NH1 and NH2 is greater than the size DD of the discharge droplet DL, the overlap area OA (see FIG. 3) is not formed between the droplets DL, and therefore, line printing instead of the area printing may be performed.

In an embodiment and referring to FIG. 6, when the distance HI2 between the nozzle holes NH1 and NH2 is greater than the size DD of the discharged droplet DL, the printing device PD2 may be rotated at a selectable angle 0°. The printing device PD2 may be rotated at the selectable angle 0° in a state in which the printing device PD2 is parallel to the target TG. For example, the printing device PD2 may be rotated at the selectable angle 0° in an area defined by the first direction DR1 and the second direction DR2. In an embodiment, the selectable angle 0° may be about 45° or less. As the printing device PD2 is rotated at the selectable angle 0°, a distance DI3 between droplets DL which are discharged through the nozzle holes NH1 and NH2 and then reach the target TG decreases. Therefore, the distance DI3 between the droplets DL may become smaller than the size DD of the droplet DL. As a result, the overlap area OA is formed between the droplets DL reaching the target TG, so that the area printing can be readily performed.

Figure 7:
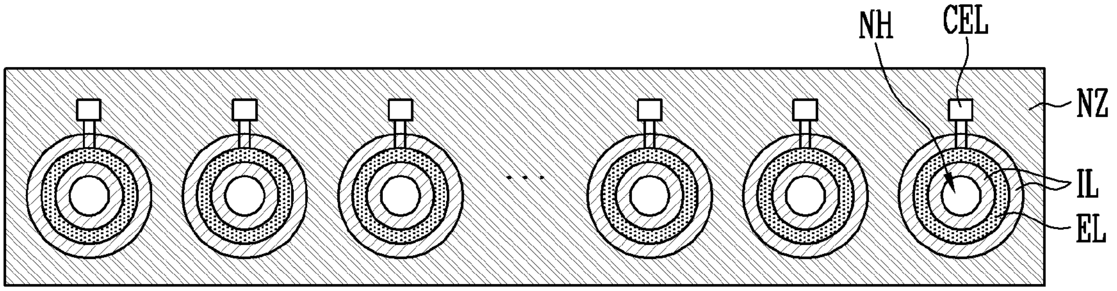
FIG. 7 is a view illustrating the arrangement structure of nozzle holes, in accordance with an embodiment.
Figure 8:
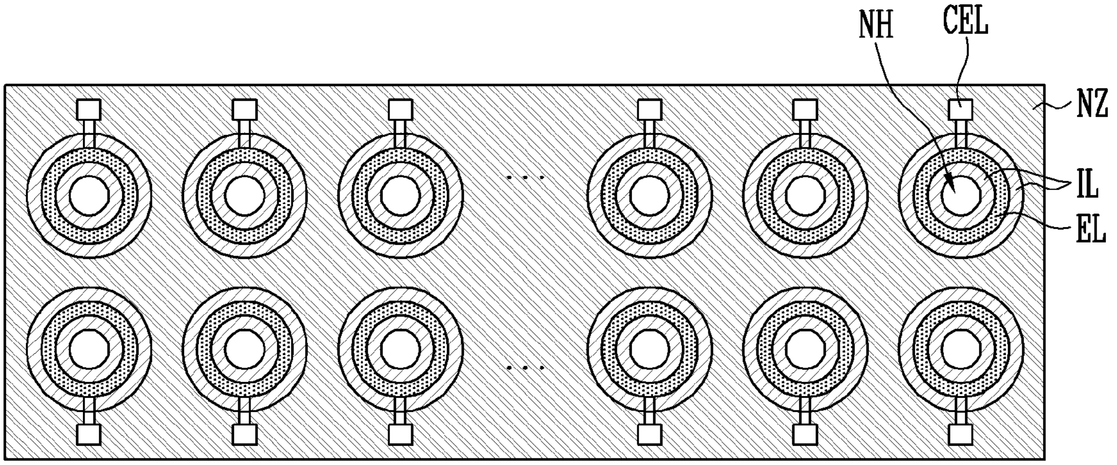
FIG. 8 is a view illustrating the arrangement structure of nozzle holes, in accordance with an embodiment.
Figure 9:
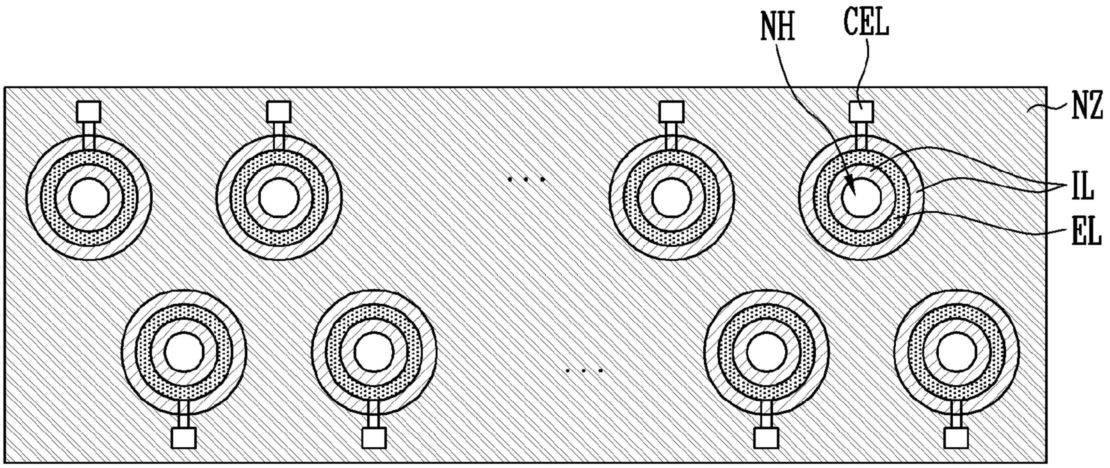
FIG. 9 is a view illustrating the arrangement structure of nozzle holes, in accordance with an embodiment.

FIGS. 7 to 9 are views illustrating arrangement structures of nozzle holes NH, in accordance with embodiments.

In an embodiment and referring to FIG. 7, a plurality of nozzle holes NH may be arranged in one row in the nozzle NZ, wherein the number of nozzle holes NH arranged in one row may vary.

In an embodiment and referring to FIG. 8, a plurality of nozzle holes NH may be arranged in two rows in the nozzle NZ, wherein the nozzle holes NH in each row may be arranged side by side. The number of nozzle holes NH respectively arranged in the two rows may vary.

In an embodiment and referring to FIG. 9, a plurality of nozzle holes NH may be arranged in two rows in the nozzle NZ, wherein the plurality of nozzle holes NH may be arranged in a zigzag form.

Meanwhile, in an embodiment, the arrangement structure of the nozzle holes NH is not limited to the arrangement structures of the nozzle holes NH shown in FIGS. 7 to 9 and may be variously modified according to printing purposes.

Figure 10:
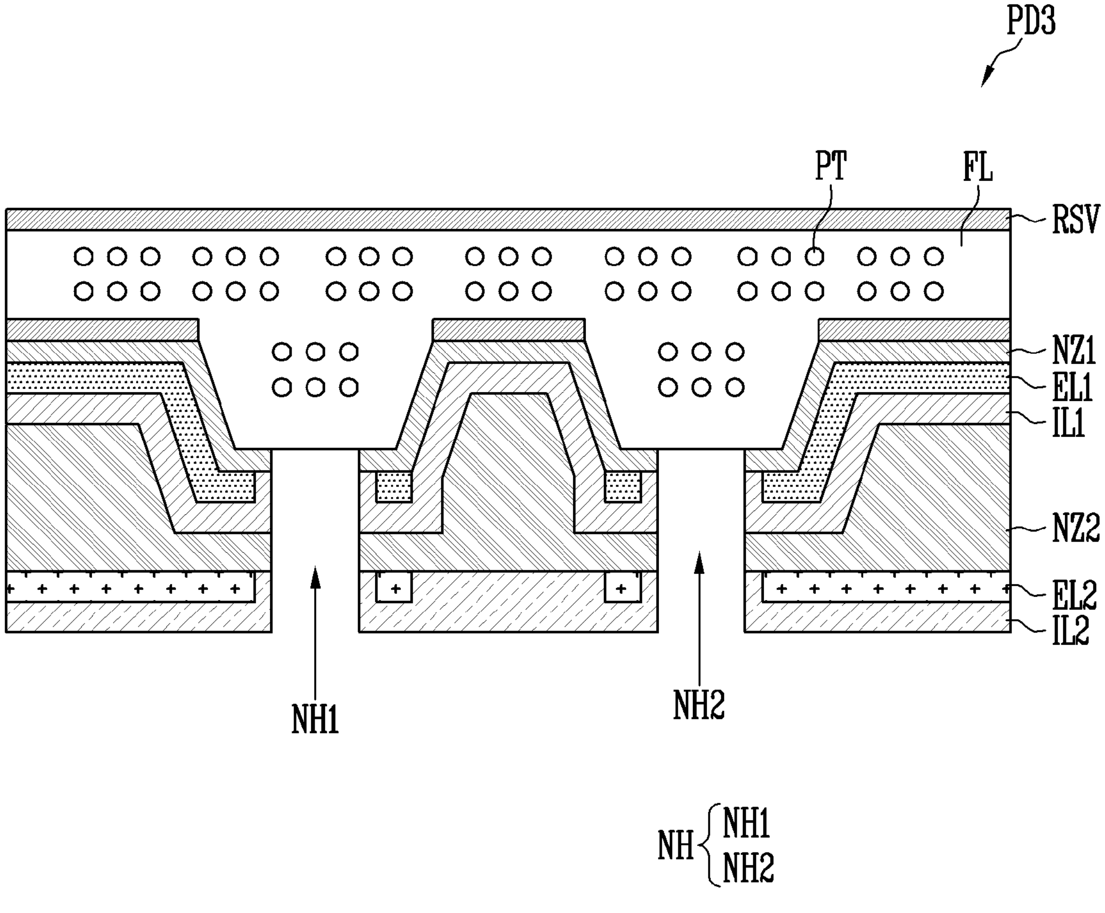
FIG. 10 is a cross-sectional view of a printing device, in accordance with an embodiment.

FIG. 10 is a cross-sectional view illustrating a printing device PD3, in accordance with an embodiment. In FIG. 10, descriptions of portions overlapping with those shown in FIG. 1 will be simplified or omitted.

In an embodiment and referring to FIG. 10, the printing device PD3 may include a plurality of nozzles NZ1 and NZ2, first electrodes EL1, second electrodes EL2, and a plurality of insulating layers IL1 and IL2. A first nozzle NZ1 may be a component substantially identical to the nozzle NZ shown in FIG. 1. The first electrodes EL1 may be components substantially identical to the electrodes EL shown in FIG. 1. A first insulating layer IL1 may be a component substantially identical to the insulating layer IL shown in FIG. 1.

In an embodiment, a second nozzle NZ2 may be disposed on the bottom of the first insulating layer IL1. The second nozzle NZ2 may include a plurality of nozzle holes NH through which a fluid FL is discharged. For example, nozzle holes NH1 and NH2 having the same shape may be formed in each of the first nozzle NZ1 and the second nozzle NZ2.

In an embodiment, the second electrodes EL2 may be disposed on at least a portion of the bottom of the second nozzle NZ2. In an embodiment, the second electrodes EL2 may overlap with at least a portion of an end of the second nozzle NZ2. The second electrodes EL2 along with the first electrodes EL1 may function to form an electric field for applying electrostatic attraction to the fluid FL.

In an embodiment, the printing device PD3 in accordance with the embodiment of the invention may generate a potential difference between the first electrodes EL1 and the second electrodes EL2, thereby forming an electric field. For example, when a negative voltage or no voltage is applied to the first electrodes EL1 and a positive voltage (or discharge voltage DV (see FIG. 2) is applied to the second electrodes EL2, a potential difference between the first electrodes EL1 and the second electrodes EL2 may be generated, thereby forming an electric field, so that the fluid FL can be discharged in the form of a droplet DL (see FIG. 3). For example, the voltage applied to the first electrodes EL1 and the voltage applied to the second electrodes EL2 may have polarities opposite to each other. Alternatively, when a potential difference is not generated between the first electrodes EL1 and the second electrodes EL2, the fluid FL may not be discharged.

In an embodiment, a second insulating layer IL2 may be disposed to surround the second electrodes EL2. For example, the second insulating layer IL2 may be disposed while being in contact with the bottoms of the second electrodes EL2 and at least a portion of the end of the second nozzle NZ2, to surround the second electrodes EL2. Accordingly, the second insulating layer IL2 can prevent the second electrodes EL2 from being in direct contact with external elements (moisture, air, and the like) or the discharged fluid FL. The second insulating layer IL2 may include silicon oxide, silicon nitride, and the like, and have a single-layer structure or a multi-layer structure.

In an embodiment, in the printing device PD1 shown in FIG. 1, a distance between the electrodes EL and the fluid FL is close. Hence, when a high discharge voltage DV is applied to the electrodes EL, the intensity of an electric field increases, and therefore, the fluid FL may be discharged through an unintended nozzle hole NH. For example, even when any voltage is not applied to an electrode EL corresponding to the second nozzle hole NH2, a high discharge voltage DV is applied to an electrode EL corresponding to the first nozzle hole NH1, and therefore, a string electric field is formed. Then, the electric field has electrostatic influence on the fluid FL in the vicinity of the second nozzle hole NH2, and therefore, the fluid FL may be discharged through the second nozzle hole NH2.

On the other hand, in an embodiment, in the printing device PD3 shown in FIG. 10, since a distance between the second electrodes EL2 to which the discharge voltage DV is applied and the fluid FL is relatively distant, the fluid FL can be prevented from being discharged through an unintended nozzle hole NH.

Figure 11:
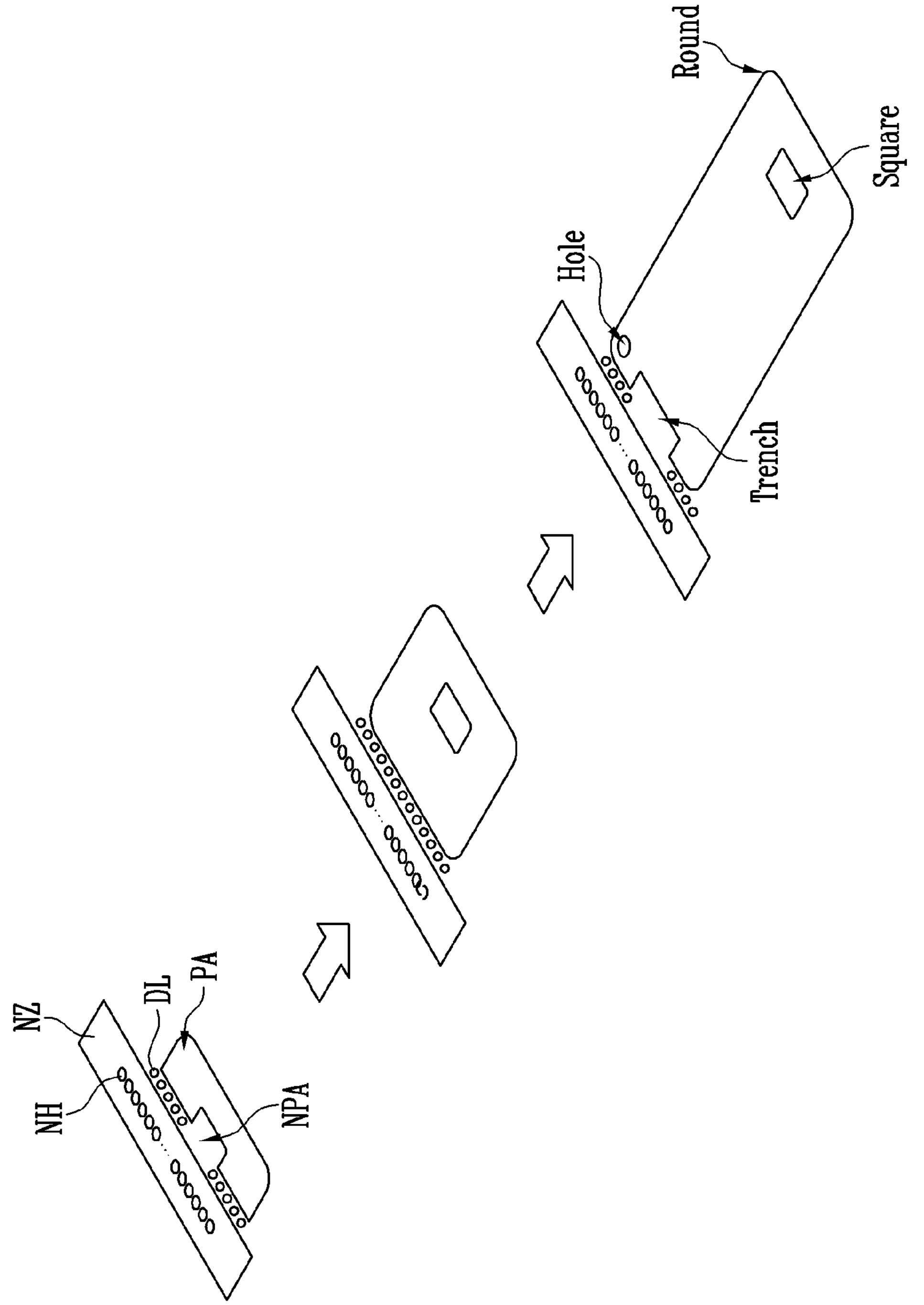
FIG. 11 is an operational flow diagram illustrating a printing method, in accordance with an embodiment.

FIG. 11 is a view illustrating a printing method, in accordance with an embodiment. For convenience of description, the nozzle NZ in which the nozzle holes NH are formed among the components of the printing device PD1 shown in FIG. 1 is exemplarily illustrated in FIG. 11.

In an embodiment and referring to FIG. 11, since individual control of the nozzle holes NH through which the fluid FL (see FIG. 1) is discharged is possible (see FIG. 2), the shape of a printed pattern or form may be freely formed. An area in which the fluid FL is discharged may be a printing area PA, and an area in which the fluid FL is not discharged may be a non-printing area NPA. For example, a pattern or form having various shapes may be printed through control of the printing area PA and the non-printing area NPA. For example, a printed pattern may have shapes such as a square, a trench, a circle, a round, and a hole.

In accordance with an embodiment, discharge of a high viscous fluid is possible, and electric field interference between nozzles (or nozzle holes) is reduced, so that area printing can be readily performed.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention. Therefore, it is to be understood that the foregoing is illustrative of various embodiments and is not to be construed as limited to the specific embodiments disclosed, and that modifications to the invention, are intended to be included within the scope of the invention. Moreover, the embodiments or parts of the embodiments may be combined in whole or in part without departing from the scope of the invention.

What is claimed is:

1. A printing device comprising:

a reservoir comprising a fluid;

a first nozzle disposed on the bottom of the reservoir, the first nozzle including a plurality of nozzle holes through which the fluid is discharged as a droplet;

first electrodes directly disposed on at least a portion of a bottom of the first nozzle, corresponding to the plurality of nozzle holes; and a first insulating layer surrounding the first electrodes.

2. The printing device of claim 1, wherein, when a distance between the plurality of nozzle holes is smaller than a size of the droplet, the distance between the plurality of nozzle holes is between about 50% to about 90% of the size of the droplet.

3. The printing device of claim 1, wherein a size of a particle included in the fluid is about 100 μm or less.

4. The printing device of claim 1, wherein an internal diameter of each of the nozzle holes is between about 100 μm to about 500 pmm.

5. The printing device of claim 1, wherein the first electrodes overlap with at least a portion of an end of the first nozzle.

6. The printing device of claim 1, wherein the first insulating layer is in contact with at least a portion of an end of the first nozzle.

7. The printing device of claim 1, further comprising connection electrodes electrically connected to the first electrodes.

8. The printing device of claim 1, further comprising a control unit individually controlling each of the plurality of nozzle holes to control whether the droplet is to be discharged through each of the nozzle holes, wherein the control unit selectively applies a discharge voltage to each of the first electrodes.

9. The printing device of claim 1, wherein an electric field is formed between the first electrodes and a grounded target such that the fluid is modified to be the droplet that is discharged.

10. The printing device of claim 1, wherein, when a distance between the plurality of nozzle holes is greater than a size of the droplet, the printing device is rotated to a selectable angle.

11. The printing device of claim 10, wherein the selectable angle is about 45° or less.

12. The printing device of claim 1, wherein the plurality of nozzle holes are arranged in one row.

13. The printing device of claim 1, wherein the plurality of nozzle holes are arranged in two rows, and wherein the plurality of nozzle holes in each row are arranged to be side by side.

14. The printing device of claim 1, wherein the plurality of nozzle holes are arranged in two rows to be arranged in a zigzag pattern.

15. The printing device of claim 1, further comprising:

a second nozzle disposed on the bottom of the first insulating layer;

second electrodes disposed on at least a portion of a bottom of the second nozzle, corresponding to the plurality of nozzle holes; and a second insulating layer surrounding the second electrodes.

16. The printing device of claim 15, wherein the second electrodes overlap at least a portion of an end of the second nozzle.

17. The printing device of claim 15, wherein the second insulating layer is in contact with at least a portion of an end of the second nozzle.

18. The printing device of claim 15, wherein an electric field is formed by a potential difference between the first electrodes and the second electrodes such that the fluid is modified to be the droplet that is discharged.

19. The printing device of claim 18, wherein no voltage or a negative voltage is applied to the first electrodes, and a positive voltage is applied to the second electrodes.

20. The printing device of claim 1, wherein the printing device forms a pattern on a target through area printing.

* * * * *